United States Patent [19]
Jurgens

[11] 3,753,072

[45] Aug. 14, 1973

[54] BATTERY CHARGING SYSTEM
[75] Inventor: Francis T. Jurgens, Chicago, Ill.
[73] Assignee: Anthony Peters, Wood Dale, Ill.
[22] Filed: Nov. 30, 1971
[21] Appl. No.: 203,161

[52] U.S. Cl................ 320/39, 320/25, 320/48, 307/66
[51] Int. Cl............................ H02j 7/10, H02j 9/00
[58] Field of Search ................ 320/39, 40, 29, 25, 320/48; 318/139; 307/66

[56] References Cited
UNITED STATES PATENTS
3,308,365  3/1967  St. John .................. 320/25
3,596,164  7/1971  Bise et al. ................ 320/9
3,443,191  5/1969  Medlar .................. 320/40 X
3,241,029  3/1966  Slomski .................. 320/40
3,343,057  9/1967  Smith .................. 320/25 X Primary Examiner—J. D. Miller
Assistant Examiner—Robert J. Hickey
Attorney—Hofgren, Wegner, Allen, Stellman & McCord

[57] ABSTRACT

A battery charging circuit for an auxiliary battery in a sump system having voltage sensing means for cutoff utilizing a line transistor which is controlled by a charging capacitor. The circuit also includes polarity protection means.

2 Claims, 3 Drawing Figures

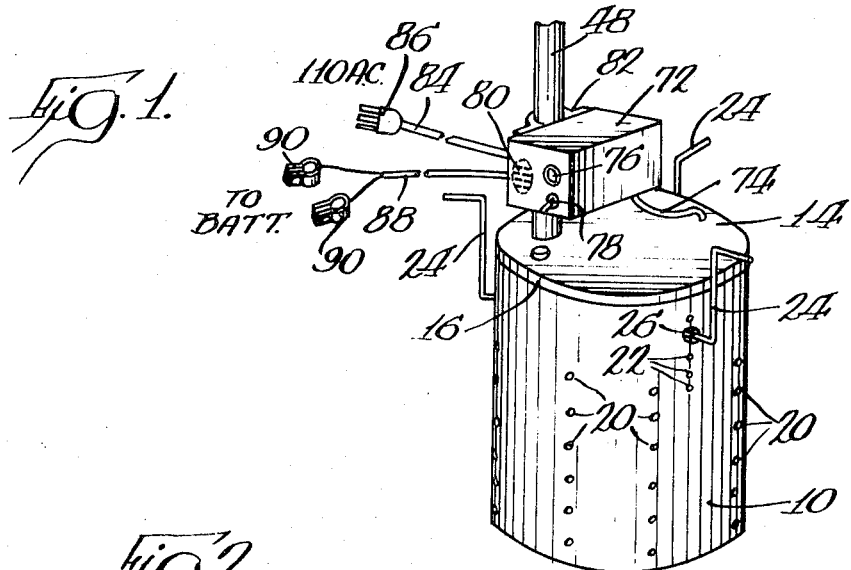
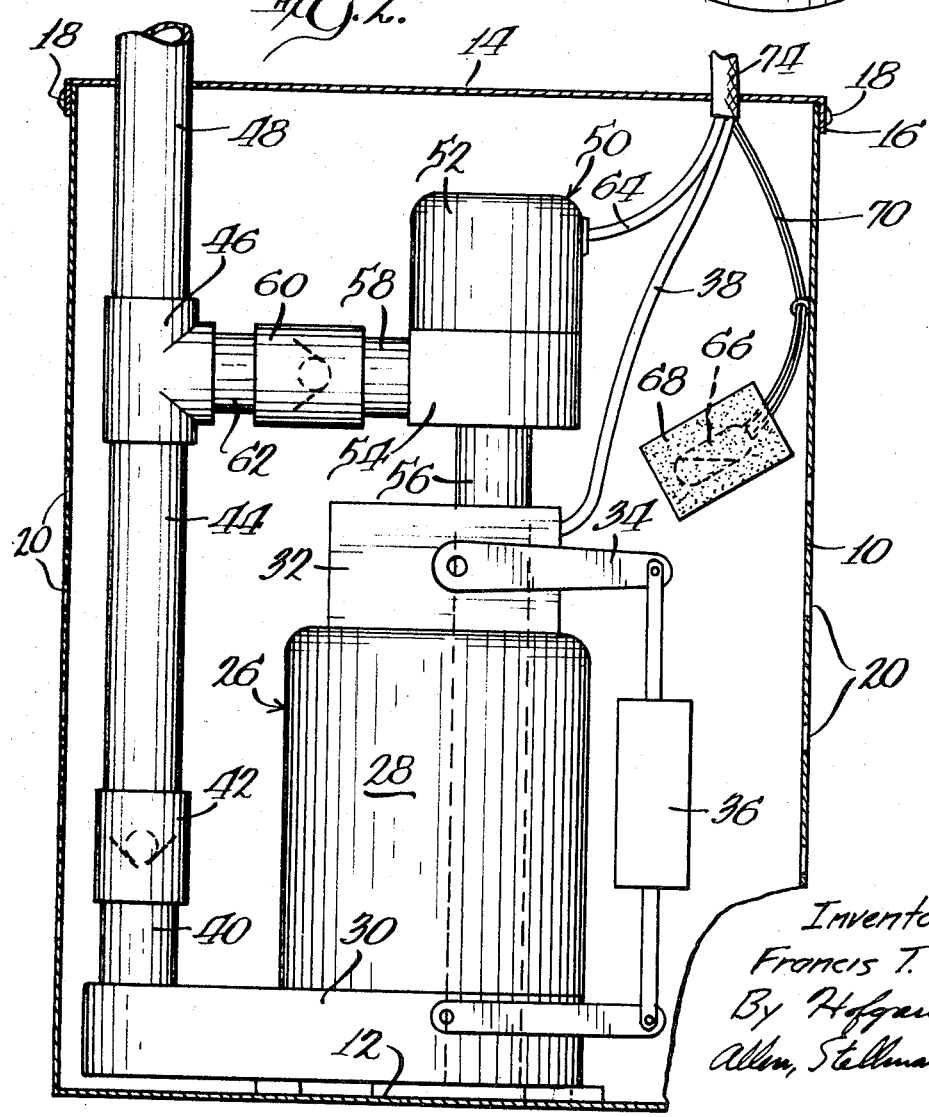

3,753,072

BATTERY CHARGING SYSTEM

BACKGROUND OF THE INVENTION

This invention relates to battery charging means for sump apparatus, and more particularly, for sump apparatus including a backup pumping system for a main pumping system operative in the event of power failure for the primary system or to assist the primary system when the same is overloaded.

The ever-increasing urbanization of society has resulted in increasing problems for owners or leasers of structures, as for example, dwelling units, having seepage problems of the types that are normally accommodated by sump apparatus. In particular, the building explosion has resulted in an increased percentage of the ground area in an urban location being covered thereby reducing the capacity of the ground to soak up precipitation with the ultimate result that minor flooding has become commonplace in a large number of urban areas. Such minor flooding would normally be accommodated by sump systems heretofore known except that the increasing urbanization has resulted in power shortages and quite frequently, a storm causing the precipitation may cut off, temporarily, the power supply necessary for operating such sump systems.

A result of the foregoing is that in such situations as "brown outs," insufficient power may be available to operate a sump system to pump out normal seepage whether or not a storm is taking place with the result that a basement or crawl space may flood. Similarly, power failures due to storms result in the removal of power for pumps for such sump systems at precisely the time that it is required to the highest degree, again, resulting in flooded basements or crawl spaces.

SUMMARY OF THE INVENTION

It is the principal object of the invention to provide a new and improved battery charging system for a sump system employing a primary pumping system and an auxiliary pumping system.

More particularly, it is an object of the invention to provide such a sump system wherein the auxiliary system is operative during power shortages, whether partial or complete, and is further operative to assist the primary pumping system, even if fully powered, at times when high pumping rates are required.

A further object is the provision of such a system that is reliable and requires little maintenance as, for example, the addition of water to a storage battery serving as an auxiliary power supply, and provides a warning to an occupant of the structure in which the same is used whenever pumping requirements are sufficiently high as to cause both pumps to operate simultaneously, or whenever there is a partial or total power failure.

The exemplary embodiment of the invention achieves the foregoing objects by means of a construction including a generally cylindrical, perforated housing having suspension hooks projecting outwardly therefrom so that the same may be easily located in a sump well in a structure without requiring specialized labor. Within the cylindrical housing there is located near the lowermost extreme thereof, a motorized principal pump having a float control and adapted to be operated off of conventional line power as, for example, the usual 120 volt 60 Hertz power available in the United States.

Also within the housing is an auxiliary pump operated by a DC motor and again float controlled. The float control of the auxiliary pump is such that the auxiliary pump will not normally be energized unless water level in the sump well is at a level well above that normally required to cause operation of the principal pump.

The outlets of the two pumps are connected through a check valve to a common conduit through which sump water may be directed to any suitable location.

A control is provided for both pumps, which control includes a unique battery charging system for a storage battery to which the auxiliary pump may be connected to derive power for operation. The charger is adapted to be operated off of the same source as the primary pump and is provided with unique circuitry whereby a storage battery may be maintained in a charged condition without causing the conversion of liquid contained in the cells thereof to a vapor necessitating periodic refilling of the battery so that an owner of a structure employing the system will never be faced with the problem of having the auxiliary system fail due to lack of water in the battery at the same time the principal system fails due to lack of power.

The control system also includes a warning system for warning an occupant of the structure whenever there is a partial or total power failure or whenever pumping requirements are sufficiently high that the auxiliary pump is energized to assist the principal pump. In addition, the control system includes a circuit for warning an occupant if the storage battery is improperly connected to the same.

Other objects and advantages of the invention will become apparent from the following specification taken in conjunction with the accompanying drawings.

DESCRIPTION OF THE DRAWINGS

FIG. 1 is a perspective view of a sump apparatus made according to the invention;

FIG. 2 is a fragmentary side elevation with parts shown in section of the sump apparatus.

DESCRIPTION OF THE PREFERRED EMBODIMENT

Figure 3:
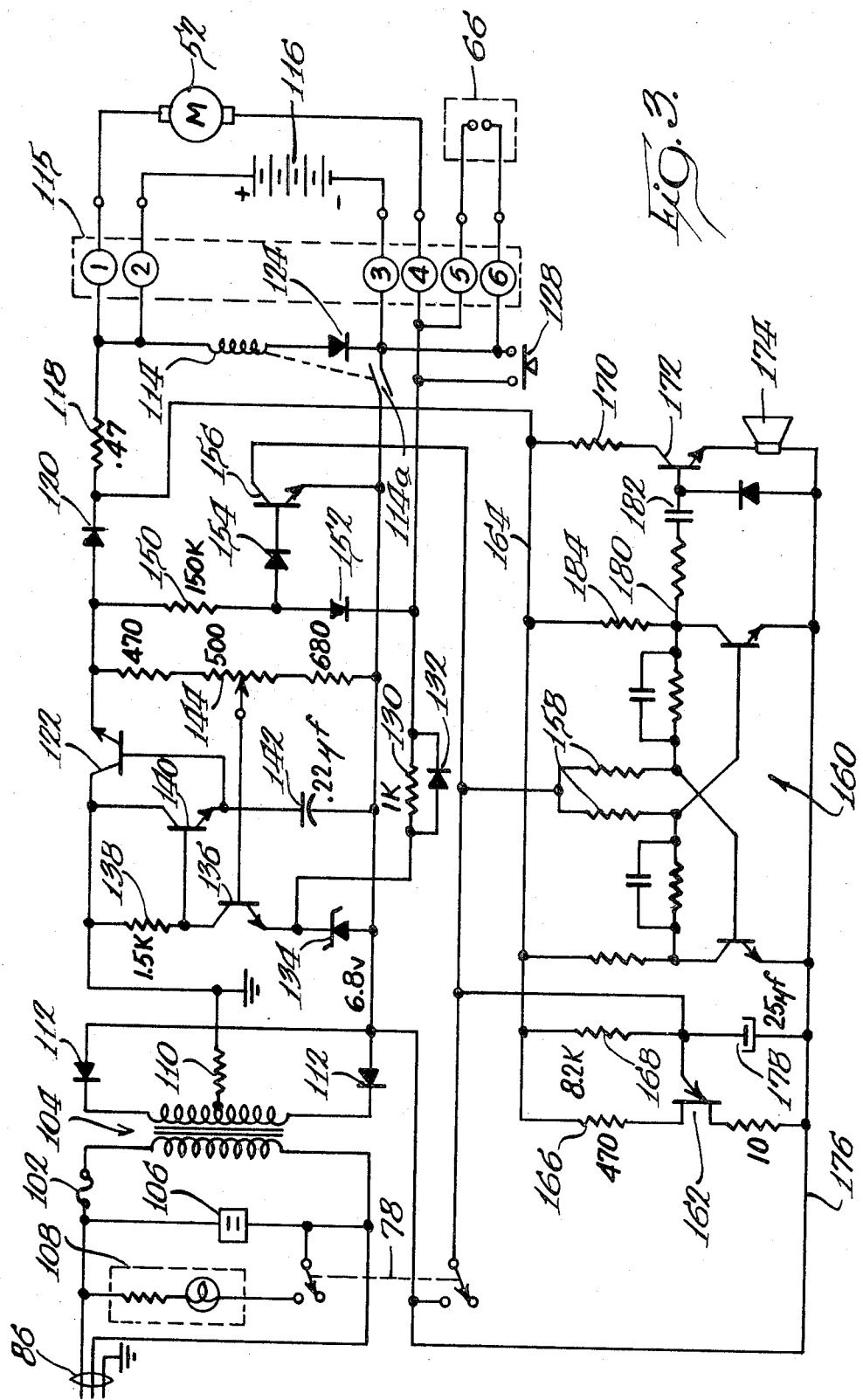
FIG. 3 is a schematic of the control and battery charging system.

An exemplary embodiment of the structural components employed in a sump system made according to the invention is illustrated in FIGS. 1 and 2 and is seen to comprise a generally cylindrical housing 10 having a bottom 12 and a removable top 14. The removable top includes a downturned peripheral flange 16 through which securing elements such as screws 18 may extend to be received in bores within the housing 10 (not shown). The housing 10 includes a plurality of apertures 20 to permit sump liquid to enter the housing as well as three sets of vertically arranged apertures 22.

Each set of apertures 22 is adapted to receive a suspension hook 24 which may be secured therein by any suitable means such as a bolt 26. The provision of a plurality of the apertures 22 in each set permits the height of the suspension hooks 24 to be selectively varied. As a result of the foregoing construction, it will be appreciated that the housing 10 may be suspended in a sump well by means of the hooks 24 in any desired vertical attitude therein by reason of the adjustable position of the hooks 24.

Within the housing 10, as best illustrated in FIG. 2, there is located a principal pumping system, generally designated 26, comprised of an AC motor 28 driving a conventional pump such as a centrifugal pump 30, a float switch 32 having an actuating arm 34 and a float 36 operatively associated with the actuating arm 34. A power cord 38 extends to the first pumping system 26 and is operative to supply energy to the same whenever the position of the float 36 causes the float switch 36 to close to operate the motor 26 in a conventional fashion.

The pump 30 includes an outlet 40 connected to a conventional check valve 42. The outlet of the check valve 42 extends via a conduit 44 to a tee 46. The tee 46 in turn includes an outlet conduit 48 through which the sump liquid may be directed and conveyed by other conduit (not shown) to any desired point.

Also within the housing 10 is a second, auxiliary pumping system, generally designated 50. The auxiliary pumping system 50 includes a direct current motor 52 drivingly associated with a pump 54 which, again, may be of the centrifugal variety. The pump 54 includes an inlet tube 56 which extends downwardly from the same toward the bottom 12 of the housing 10 as well as an outlet conduit 58 extending to a second check valve 60 and then via a section of conduit 62, to the tee 46. A DC power cord 64, connected as will be shown, extends into the casing to the DC motor 52 and a float switch comprised of a mercury switch 66 embedded in a float 68 formed of foam or the like is also received within the housing 10. Electrical leads 70 extend from the mercury switch 66 to a control system for energizing the DC motor 52 as will be seen.

Of particular significance in the above-described arrangement is the location of the float switch 66, 68 for the DC motor 52 forming part of the auxiliary pumping system 50. As illustrated in FIG. 2, the same is located substantially above the float 36 for the principal pumping system 26 with the result being that the principal pumping system 26 will be enabled by the position of its float 36 long before the auxiliary pumping system 50 will be similarly enabled by movement of its float switch 66, 68. The purpose of this arrangement is principally to insure that the auxiliary system 50 will not be energized when power is available for the principal system 26 unless the water level in the sump well in which the device is received has attained a sufficient level it becomes evident that the principal system 26 cannot keep up with the inflow of water or is otherwise inoperative. Thus, when the flow of sump liquid into the sump well is at a greater rate than the flow out of the same by reason of operation of the principal system 26, and such a condition prevails for a period, the gradual buildup of water in the sump well will result in the energization of the auxiliary system 50 as well. And the resultant operation of both systems simultaneously will generally be sufficient to keep up with an inflow that is greater than what the principal system 26 alone can handle.

Returning to FIG. 1, the system further includes a control housing 72 which receives an electrical lead 74 containing the cords 38 and 64 and the leads 70. The housing also mounts an indicator light 76 and a manually operable toggle switch 78 as well as a speaker grate 80. Suitable brackets 82 may be employed to secure the housing 72 to the outlet conduit 48. In addition, a cord 84 having a plug 86 extends to the housing 72 and is adapted to connect the same to a suitable source of power. Finally, a cord 88 including battery clips or terminals 90 extends from the housing 72 for connection to a storage battery which may serve as an auxiliary source of power for purposes of operating the auxiliary system 50.

One form of a suitable control system is illustrated in FIG. 3 and is seen to include the plug 86 for connection to a suitable source of alternating current power. One side of the line of the plug is connected through a fuse 102 to the primary of a step down transformer, generally designated 104, and then returned to the other side of the power source. Across the line prior to the fuse 102 is a conventional female receptacle 106 in which a plug (not shown) on the line 38 to the principal pump system 26 may be received to supply power thereto.

Also included is an indicator light 108 connected to one contact of a double pole, single-throw switch comprising the toggle switch 78. The other side of the switch is connected to power so that when the switch is in a closed position and power is available, the indicator light 108 will be operated. As mentioned previously, an alarm is provided to operate under certain circumstances as will be see as, for example, when there is a power failure and the purpose of the switch 78 is to deactivate the alarm once its warning has been communicated to an observer. With the switch 78 in the position illustrated in FIG. 3, the alarm is activated and to be deactivated, its position is changed. As a result, if power were to be restored with the alarm deactivated, the indicator light 108 would be illuminated to indicate to the observer that power has been restored and that the alarm has been deactivated so that an observer will be alerted to reactivate the alarm circuitry.

Returning to the transformer 104, the secondary of the same includes a center tap connected via a resistor 110 to ground while the ends thereof are connected in common through diodes 112 to define a full wave rectifier. The common junction of the diodes 112 is connected through normally open contacts 114a of a reed switch 114 to the No. 3 contact of a terminal board 115. The negative terminal of a storage battery 116 providing an auxiliary source of power is also connected to the No. 3 contact of the terminal board 115 while the positive side of the battery 116 is connected to the No. 2 contact of the terminal board which in turn is returned to ground via a current limiting resistor 118, a diode 120 and a power transistor 122. As a result, when the contacts 114a are closed and when the transistor 122 is conducting, the battery 116 is placed in a charging circuit provided that the positive voltage at the emitter of the transistor 122 is greater than the voltage at the positive terminal of the battery 116 by an amount at least equal to the forward breakover voltage of the diode 120.

The reed switch 114 is connected in series with a diode 124 across terminals No. 2 and No. 3 of the terminal board 115. Preferably, the reed switch 114 offers a high impedance to the flow of current. As can be seen from FIG. 3, when the battery 116 is properly connected to the terminal board 115, current will flow through the reed switch 114 to cause the contact 114a to close so that the battery may be charged as appropriate. On the other hand, if the battery 116 is improperly connected to the terminal board 115, the presence of the diode 124 will preclude the passage of current through the reed switch 114 resulting in the contact 114a remaining open so that the battery 116 will not be connected into the control circuit to preclude damage thereto. In addition, as will be seen, if in such a situation power is provided to the control circuit, a warning will be generated to an observer to indicate that the battery 116 is improperly connected.

The DC motor 52 for the auxiliary system 50 has one terminal connected to the positive side of the battery 116 via terminal No. 1 of terminal board 115 while its other terminal is connected in series with the mercury switch 66 and returned to the negative side of the battery 116. In addition, a manually operable, normally open test switch 128 is provided in parallel with the mercury switch 66 so that the auxiliary system 50 may be tested by manually closing switch 128 and observing the response of the DC motor 52.

The side of the motor 52 connected to the switches 66 and 128 is also connected through the parallel combination of a resistor 130 and a diode 132 to the cathode of a Zener diode 134. The anode of the Zener diode 134 is connected to the common junction of the diodes 112 and the relay contacts 114a.

The cathode of the Zener diode 134 is also connected to the emitter of a transistor 136 which in turn has its collector connected through a resistor 138 to ground. The base of a transistor 140 is connected to the common junction of the resistor 138 and the transistor 136 and has its collector connected to ground while its emitter is connected to the base of the transistor 122. In addition, the emitter of the transistor 140 is connected to the common junction of the diodes 112 via a capacitor 142.

A string of resistors including a potentiometer 144 is connected across the emitter of the transistor 122 to the common junction of the diodes 112 and the wiper of the potentiometer 144 is connected to the base of the transistor 136. The potentiometer 144 serves as a set point control for the conduction of transistor 136 according to the voltage drop across the string of resistors which will be substantially equal to that across the battery 116 (in actuality, it will be slightly higher in view of the presence of the diode 120). That is, the wiper of the potentiometer 144 will be adjusted in such a way that the transistor 136 will be rendered non-conducting except when the battery 116 is fully charged as representative of a corresponding voltage differential across the string of resistors.

As can be seen from the circuitry described thus far, if the battery 116 has a sufficient charge to operate the DC motor 52, the same will be operated in response to the float control of the mercury switch 66 in more or less a conventional manner. With regard to the charging of the battery 116, if the same is not fully charged, the voltage across the resistor string including the potentiometer 144, will be such that the transistor 136 will be in a non-conducting state with the result that a positive potential will be applied to the base of the transistor 140 to cause the same to conduct. As a result, the capacitor 142 will charge to a voltage approximately equal to that on the collector of the power transistor 122 with the result that the latter will be forward biased and conduct to supply charging current to the battery 116. In practical operation, the voltage at the emitter of the transistor 122 will never be substantially greater than that at the positive terminal of the battery 116 even though the voltage at the center tap of the secondary of the transformer 104 may be substantially greater. And similarly, the voltage at the collector of the transistor 122 will scarcely be greater than at the emitter thereof and as a result, when the transistor 140 is conducting, the maximum voltage across the capacitor 142 will be approximately equal to that across the battery 116. As a result, when the battery is not fully charged, the capacitor 142 will serve to forward bias the power transistor 122 to cause continued charging of the battery at a rate proportional to the voltage differential between the battery and the power source represented by the secondary of the transformer 104.

However, when the battery is fully charged, as during each half wave, the voltage at the emitter of the power transistor 122 reaches battery potential, such a potential will be applied across the string of resistors including the potentiometer 144 with the result that the transistor 136 will be forward biased to conduct. Thus, a voltage will be present at its collector equal to that of the breakdown voltage of the Zener diode 144 and such a voltage will be applied to the base of the transistor 140 causing the same to cease conducting, at least temporarily.

As a result, the only voltage that may be applied to the transistor 122 to cause the same to conduct will be that of the capacitor 142 which will continue to forward bias the latter to an on condition as the voltage of each half wave moves upwardly toward the voltage appearing across the battery 116. However, as soon as such a voltage is exceeded, the transistor 122 will no longer be forward biased and will be turned off thus effectively halting the flow of any charging current to the battery 116 to preclude vaporization of electrolytic fluid therein.

Of course, there will be a certain amount of discharging of the capacitor 142 through the base emitter junction of the transistor 122 but the charge is re-established by reason of the following action. When the transistor 122 turns off, as mentioned previously, it will be apparent that there will no longer be a forward biasing of the transistor 136 with the result that on the succeeding half wave, the transistor 140 may again be turned on to recharge the capacitor to battery potential and the charging of the same will be halted at such potential by reason of the resulting turning on of the transistor 122 resulting in the transistor 136 again being forward biased by the potential from the wiper of the potentiometer 144 to turn off the transistor 140. As a result, the condition of the battery 116 is continuously monitored and charging current will be applied to the same only when required.

In order to preclude damage to the circuit in the event the auxiliary pump motor 52 is energized while power is available, the transistor 136 may be turned on to saturation by reason of the connection from the common junction of its emitter and the Zener diode 134 through the diode 132 to the switches 128 and 66. When either such switch is closed, the above-mentioned junction will be connected directly to the negative side of the battery 160 so that the transistor 136 will be continuously maintained on. The aforementioned switching action will be sufficient to maintain the charge in the capacitor 142 at a sufficiently high level to allow the transistor 122 to conduct briefly during each half wave to apply a biasing potential to the transistor 136 but not sufficiently long so that circuit damage would result.

With the foregoing in mind, the alarm portion of the circuitry will now be described. Specifically, one side of a resistor 150 is connected to the common junction of the diode 120 and the power transistor 122 while the other side is connected to the common junction of a pair of diodes 152 and 154. The diode 152 is connected to the common junction of the diode 132 and the resistor 130 while the diode 154 is connected to the base of a transistor 156 having its emitter connected to the common junction of the diodes 112. As will be seen, when the transistor 156 is conducting, no alarm may be sounded. However, when the same is rendered non-conducting, an alarm will be sounded. The foregoing connections illustrate that normally the transistor 156 will be conductive inasmuch as the common junction of the diode 152 and 154 will be normally held at the breakdown voltage of the Zener diode 134. Should, however, either of the switches 66 and 128 be closed, the aforementioned common junction will be at a potential equal to that of the negative side of the battery 116 resulting in a lack of forward biasing of the transistor 156 to turn off the same. Also, should power fail, it will be appreciated that no forward biasing potential may be applied through the transistor 150 and, again, the transistor 156 will turn off. Thus, whenever one of the switches 128 and 66 is closed with or without the presence of power, the transistor 156 will be turned off; or if power fails, the same will again be turned off, either instance resulting in the sounding of an alarm.

More particularly, the collector of the transistor 156 is connected to the common junction of a pair of resistors 158 in a free running multivibrator, generally designated 160, to the emitter of a unijunction transistor 162 and to the other pole of the switch 78. Thus, when the transistor 156 is conducting, each of the foregoing elements will be connected to the negative side of the battery 116.

Positive power to the alarm circuit is provided by a line connected to the battery side of the diode 120 and designated 164. The free running multivibrator 160 has connections to the line 164 as indicated and one base of the unijunction transistor 162 is connected through a resistor 166 to the line 164. In addition, the emitter of the unijunction transistor 162 is connected through a resistor 168 to the line 164 while a resistor 170 connected to the collector of a transistor 172 is similarly connected to the line 164.

The emitter of the transistor 172 is connected through a speaker 174 which in turn is returned to the negative side of the battery 116 by a line 176. In addition, the free running multivibrator 160 has the connections indicated to the line 176 while a capacitor 178 is connected to the emitter of the unijunction transistor 162 and to the line 176 while a resistor connects to the other base of the unijunction transistor 162 to the line 176. Finally, a contact of the second pole of the switch 178 is connected to the line 176.

The operation of the alarm circuit is as follows. When the transistor 156 is conducting, the negative side of the battery 116 will be connected to both sides of the capacitor 178 so that the same cannot charge to fire the unijunction transistor 162. By the same token, the connection of the resistors 158 of the free running, multivibrator 160 to the negative side of the battery 116 will preclude operation of the same. Thus, no signal will be present on an output line 180 from the free running multivibrator 160 through a capacitor 182 to the base of the transistor 172 and the latter will be turned off to preclude energization of the speaker 174. However, when the transistor 156 ceases to conduct by reason of any of the occurrences mentioned previously, the removal of negative potential to the resistors 158 will result in the free running multivibrator 160 beginning to oscillate. As a result, an oscillating output signal will be present on the line 180 to drive the transistor 172 to cause the speaker 174 to emit a warning sound. The particular warning signal will not be of constant pitch by reason of the fact that the cessation of conduction of the transistor 156 will also result in the capacitor 178 charging through the resistor 168. As a result, an asymptotically increasing positive potential will be applied to the resistors 158 to ultimately cause an increase in the oscillation rate of the free running multivibrator 160. Thus, the tone emitted by the speaker 174 will begin at a low pitch and increase in pitch. As the capacitor 178 charges, eventually voltage will appear at its junction with the resistor 168 of sufficient magnitude to cause the unijunction transistor 162 to fire. The low values of the resistances in the base circuit of the unijunction 162 will essentially cause the removal of power from the free running multivibrator 160 and the same will cease to provide an oscillating output signal. At the same time, the capacitor 178 will discharge through the unijunction resistor 162 and when discharged, the process will repeat itself. Thus, the warning emitted by the speaker 174 will be a repetitive tone of increasing pitch.

In the event the warning is sounded and it is desired by an observer to cease the operation of the alarm, the switch 78 may be moved to its position other than that shown in FIG. 3 with the result that the alarm will be de-energized in the same manner as if the transistor 156 were conducting.

As mentioned previously, the alarm circuit also provides a warning when the battery 116 is improperly connected to the terminal board 115. It will be recalled that when the connection is improper, the contacts 114a will be open and as a result, the full wave rectified signal without the smoothing action caused by the presence of the battery 116 will be applied on line 164 through a resistor 184 forming part of the free running multivibrator 160 to the output line 180 thereof and to the base of the transistor 172. At the same time, a positive potential will be applied to the collector of the transistor 172 through the resistor 170 and resulting in the transistor 172 conducting to drive the speaker 174.

However, the sound will be totally different than that mentioned previously. In particular, the same will be a power hum generated by the full wave rectified signal of constant pitch.

Thus, the system provides one type of warning for the occurrences where there is a power failure or when the water level in a sump well is sufficiently high that the auxiliary pump is energized along with the principal system when power is present, both indicating an emergency situation; and a second type of warning when the auxiliary power supply in the form of the battery 116 is improperly connected. In addition, it will be appreciated that the invention includes a means for precluding damage to the circuit in the event the battery 116 is improperly connected thereto as well as the aforementioned warning and the nature of the charging circuit is such that battery electrolyte is not evaporated by reason of an everpresent trickle charge but yet provides utmost sensitivity to battery charging requirements. Thus, a user of the system will never be faced with a situation where, after three or four months of the system being on the line, an emergency situation occurs and full auxiliary power is not available by reason of low liquid levels in the battery 116.

I claim:

1. A battery charging system for charging batteries on demand and operative to prevent continued charging current passage when the battery is fully charged, said system comprising:

rectifying means adapted to receive an A.C. signal and convert the same to a D.C. signal;

means connected to said rectifying means and adapted to be connected to a battery for conducting said D.C. signal to a battery;

battery charge regulating means including electronic switch means in said conducting means and operative when on to permit the passage of current to a battery and when off to preclude passage of current to a battery; and means across said conducting means and arranged to by pass a battery connected thereto for sensing the voltage to be applied to the battery and for turning said electronic switch means off whenever the voltage exceeds that corresponding to a desired maximum charge to thereby preclude vaporization of battery electrolyte which would result in a decrease in the energy storage capacity of the battery and yet insure the maintenance of a desired maximum charge on the battery;

said conducting means comprising a pair of electrical conductors, said switch means comprising a transistor in one of said conductors, and said sensing means comprising a voltage divider across said conductors and biasing means for said voltage divider, said biasing means comprising a second transistor and a resistor serially connected across said conductors between said rectifier and said first transistor, a third transistor having its base connected to the junction of said second transistor and said resistor and its collector-emitter circuit serially connected with a capacitor across said conductors, the common junction of said third transistor and said capacitor being connected to the base of said first transistor, said voltage divider being connected to the base of said second transistor.

2. The battery charging system of claim 1 wherein said conducting means comprise a pair of conductors and further including normally open switch means in one of said conductors and means responsive to the connection of a battery across said conductors for closing said normally open switch means only when the polarity of the battery matches that of said rectifying means to preclude circuit damage.

* * * * *